(12) United States Patent
Ito et al.

(10) Patent No.: US 8,257,882 B2
(45) Date of Patent: Sep. 4, 2012

(54) CATHODE FOR FUEL CELL AND PROCESS OF THE SAME

(75) Inventors: Naoki Ito, Yokohama (JP); Akira Kondo, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 695 days.

(21) Appl. No.: 11/578,369

(22) PCT Filed: Mar. 28, 2005

(86) PCT No.: PCT/JP2005/006543
§ 371 (c)(1),
(2), (4) Date: Oct. 13, 2006

(87) PCT Pub. No.: WO2005/104278
PCT Pub. Date: Nov. 3, 2005

(65) Prior Publication Data
US 2007/0224478 A1 Sep. 27, 2007

(30) Foreign Application Priority Data

Apr. 23, 2004 (JP) ................. 2004-127604

(51) Int. Cl.
*H01M 4/02* (2006.01)
*H01M 4/04* (2006.01)
*H01M 4/36* (2006.01)
*H01M 8/10* (2006.01)
*H01M 4/88* (2006.01)

(52) U.S. Cl. ......... 429/523; 429/484; 429/482; 502/101

(58) Field of Classification Search ............ 429/30, 429/40, 42–44, 523, 484, 482, 488–489, 429/495, 528, 532, 535; 29/623.5; 264/618, 264/642; 427/115; 502/101, 150, 300, 302–303; 96/11

See application file for complete search history.

(56) References Cited

U.S. PATENT DOCUMENTS 3,556,856 A * 1/1971 Elbert ......................... 429/42
5,498,278 A * 3/1996 Edlund ........................ 96/11

(Continued)

FOREIGN PATENT DOCUMENTS

EP 0 796 827 A1 9/1997

(Continued)

OTHER PUBLICATIONS

Uchida H et al., "High performance electrodes for medium-temperature solid oxide fuel cells: Activation of La (Sr)CoO3 cathode with highly dispersed Pt metal electrocatalysts" Solid State Ionics, North Holland Pub. Company, Amsterdam, NL, vol. 135, No. 1-4, Nov. 2000, pp. 347-351.

(Continued)

*Primary Examiner* — Barbara Gilliam
*Assistant Examiner* — Claire L Roe
(74) *Attorney, Agent, or Firm* — Oliff & Berridge, PLC (57) ABSTRACT

The cathode 114 is formed by forming several layers comprising an inorganic material that is primarily electron conductive and a complex oxide B that is primarily oxygen ion conductive and that supports an oxygen dissociation-promoting catalyst, on an electrolytic membrane 112. The electrolytic membrane 112 and the outermost layer of the cathode 114 (layer of mixture furthest from the electrolytic membrane 112) facing the separator 120 are physically and electrically continuous by means of the inorganic material a and complex oxide B disposed between them.

11 Claims, 6 Drawing Sheets

U.S. PATENT DOCUMENTS

| | | | |
|---|---|---|---|
| 6,004,696 A | 12/1999 | Barnett et al. | |
| 6,300,000 B1 * | 10/2001 | Cavalca et al. | 429/40 |
| 6,756,150 B2 * | 6/2004 | Karuppaiah et al. | 429/44 |
| 6,767,662 B2 * | 7/2004 | Jacobson et al. | 429/30 |
| 7,291,417 B2 * | 11/2007 | Herman et al. | 429/40 |
| 2002/0003085 A1 | 1/2002 | Chandran et al. | |
| 2002/0064709 A1 * | 5/2002 | Ovshinsky et al. | 429/218.2 |
| 2003/0219641 A1 * | 11/2003 | Petillo | 429/38 |
| 2004/0043277 A1 | 3/2004 | Ito et al. | |
| 2004/0197638 A1 * | 10/2004 | McElrath et al. | 429/44 |
| 2004/0231143 A1 * | 11/2004 | Visco et al. | 29/623.5 |
| 2005/0031519 A1 | 2/2005 | Vaughey et al. | |

FOREIGN PATENT DOCUMENTS

| | | |
|---|---|---|
| EP | 1 110 594 B1 | 7/2003 |
| JP | A-04-284361 | 10/1992 |
| JP | A 4-345762 | 12/1992 |
| JP | A 5-299105 | 11/1993 |
| JP | A 2001-93325 | 4/2001 |
| JP | A-2001-522518 | 11/2001 |
| JP | A 2003-7309 | 1/2003 |
| JP | A-2004-063460 | 2/2004 |
| JP | A 2004-103338 | 4/2004 |
| JP | A 2005-072015 | 3/2005 |
| WO | WO 02/084774 | 10/2002 |
| WO | WO 03/056651 A2 | 7/2003 |
| WO | WO 03/084894 | 10/2003 |

OTHER PUBLICATIONS

Erning J W et al., "Catalysis of the electrochemical process on solid oxide fuel cell cathodes," Journal of Power Sources, Elsevier, Amsterdam, NL, vol. 61, No. 1-2, Jul. 1996, pp. 205-211.

Daroukh Al M., et al., "Oxides of the AMO3 and A2MO4-type: structural stability, electrical conductivity and thermal expansion," Solid State Ionics, North Holland Pub. Co., Amsterdam, NL, vol. 158, No. 1-2, Feb. 2003, pp. 141-150.

* cited by examiner

CATHODE FOR FUEL CELL AND PROCESS OF THE SAME

TECHNICAL FIELD

The invention relates to a cathode used in a fuel cell, and a method for producing the cathode.

BACKGROUND ART

Cathodes are known to be an important factor in reducing cell performance in fuel cells. The cathode reaction in fuel cells using a proton conductor as the electrolyte is broken down into the three following processes.
(1): oxygen decomposition activation $1/2O_2 + 2e^- \rightarrow O^{2-}$
(2): migration of oxygen ions $O^{2-}$ ((1) reaction field)
(3): production of water $2H^+ + O^{2-} \rightarrow H_2O$ The (1) the oxygen decomposition activation is assumed to be the rate-limiting process, and attempts have been made in the past to expand the reaction field to increase the activity in (1).

For example, the use of the noble metal Pt for the cathode will increase the reactivity in (1), but Pt lacks any oxygen ion transport capacity, thus limiting the reaction field of (1) to the proximity of the triple-phase boundary where the reaction of (3) takes place. It is thus impossible to obtain high activity in terms of the cathode as a whole. Large amounts of expensive noble metal must also be used.

By contrast, a technique has been proposed for using a complex oxide (a combined oxygen ion/electron conductor) having both oxygen ion and electron conductivity, such as $La_{0.6}Sr_{0.4}CoO_3$ (LSC), as the cathode (see, for example, Patent Citation 1). The oxygen ion conductivity of the complex oxide allows the $O^{2-}$ that is produced to be used in the water-producing reaction over the entire surface of the cathode. When the LSC does not have enough $O^{2-}$ decomposition activity, platinum can be supported on the surface to enhance the reactivity in (1).

However, even though the above combined oxygen ion/electron conductor is endowed with sufficient oxygen ion conductivity and electron conductivity at temperatures of 800 degrees or higher, a problem is the insufficient oxygen ion conductivity and electron conductivity in the intermediate temperature range of 200 to 600 degrees, for example. Oxygen ion conductivity, in particular, is a temperature-related function. Oxygen ion conductivity decreases as the temperature drops.

Cathodes comprising combined oxygen ion/electron conductors thus cannot be used in fuel cells with an operating temperature range in the intermediate temperature range of 200 to 600 degrees, and the power-generating performance of fuel cells cannot be improved.

DISCLOSURE OF THE INVENTION

An object of the present invention, which is intended to overcome the above problems, is to provide a cathode having good oxygen ion conductivity in the intermediate temperature range, and to improve the performance of fuel cells in the intermediate temperature range.

A first aspect of the invention for addressing the above problems provides a cathode for a fuel cell. The cathode of the first aspect of the invention comprises a complex oxide having primarily oxygen ion conductivity, an inorganic material having primarily electron conductivity, and an oxygen dissociation catalyst having greater catalyst activity in the oxygen dissociation reaction than the complex oxide and inorganic material at a predetermined temperature range.

The cathode in the first aspect of the invention promotes the oxygen dissociation reaction on the cathode at a predetermined temperature range, allowing the oxygen ion conductivity performance and electron conductivity performance to be improved. The power-generating performance of the fuel cell can thus be improved.

In the cathode of the first aspect of the invention, the oxygen dissociation catalyst may be supported by at least the complex oxide, or more of it may be supported by the complex oxide than by the inorganic material. This arrangement will allow oxygen ions to be obtained on the complex oxide having primarily oxygen ion conductivity, and it is possible thereby to promote the migration of oxygen ions. As a result, the power-generating performance of the fuel cell can be improved.

In the cathode of the first aspect of the invention, the conductive paths of the complex oxide and inorganic material may both be continuous in the thicknesswise direction of the cathode. This may promote oxygen ion and electron conduction (migration) in the thicknesswise direction of the cathode. As a result, the power-generating performance of the fuel cell can be improved.

In the cathode of the first aspect of the invention, the particle diameter of the complex oxide and the particle diameter of the inorganic material may be virtually equivalent. This will permit the formation of conduction paths for the complex oxide and inorganic material, which are continuous in the widthwise direction of the cathode.

In the cathode of the first aspect of the invention, the cathode may have a contact surface in contact with an electrolytic membrane, and the amount of the oxygen dissociation catalyst that is supported may decrease the further the distance from the surface in contact with the electrolytic membrane. This will allow oxygen ions to be efficiently produced while controlling the amount of oxygen dissociation catalyst that is used.

In the cathode of the first aspect of the invention, the oxygen ion conductivity of the complex oxide may be at least $10^4$ (S/cm) at the predetermined temperature range. This may further promote the migration of oxygen ion in the predetermined temperature range.

The cathode of the first aspect of the invention may further comprise a proton-conducting material. This may increase the field for the reaction producing the water.

The cathode of the first aspect of the invention may be used in a hydrogen separation membrane type of fuel cell comprising an electrolytic membrane with a proton-conducting electrolyte laminated to a hydrogen-permeable metal film. The operating temperature of this type of fuel cell is in the intermediate temperature range. Using the cathode of the first aspect of the invention thus allows the power-generating properties in the intermediate temperature range to be improved.

A second aspect of the invention provides a fuel cell. The fuel cell in the second aspect of the invention comprises a cathode according to the first aspect of the invention, an anode, and an electrolytic membrane with the cathode disposed on one side and the anode disposed on the other side.

In the fuel cell of the second aspect of the invention, the cathode of the first aspect of the invention affords better action and effects, resulting in a fuel cell with better power-generating performance in the intermediate temperature range.

A third aspect of the invention provides a method of producing a cathode for a fuel cell. The method in the third aspect of the invention comprises supporting an oxygen dissociation catalyst on a complex oxide having primarily oxygen ion conductivity, physically mixing the complex oxide supporting the oxygen dissociation catalyst with an inorganic material having primarily ion conductivity and forming the mixture of the inorganic material and the complex oxide supporting the oxygen dissociation into a film on one side of the electrolytic membrane.

The method of producing a cathode for a fuel cell in the third aspect of the invention may also include forming another film of the mixture on the previously formed film of the mixture.

The method of producing a fuel cell cathode in the third aspect of the invention allows the cathode of the first aspect of the invention to be obtained.

BEST MODE FOR IMPLEMENTING THE INVENTION

The cathode of the invention and a method for producing the cathode are illustrated in the examples below with reference to the drawings.

Figure 1:
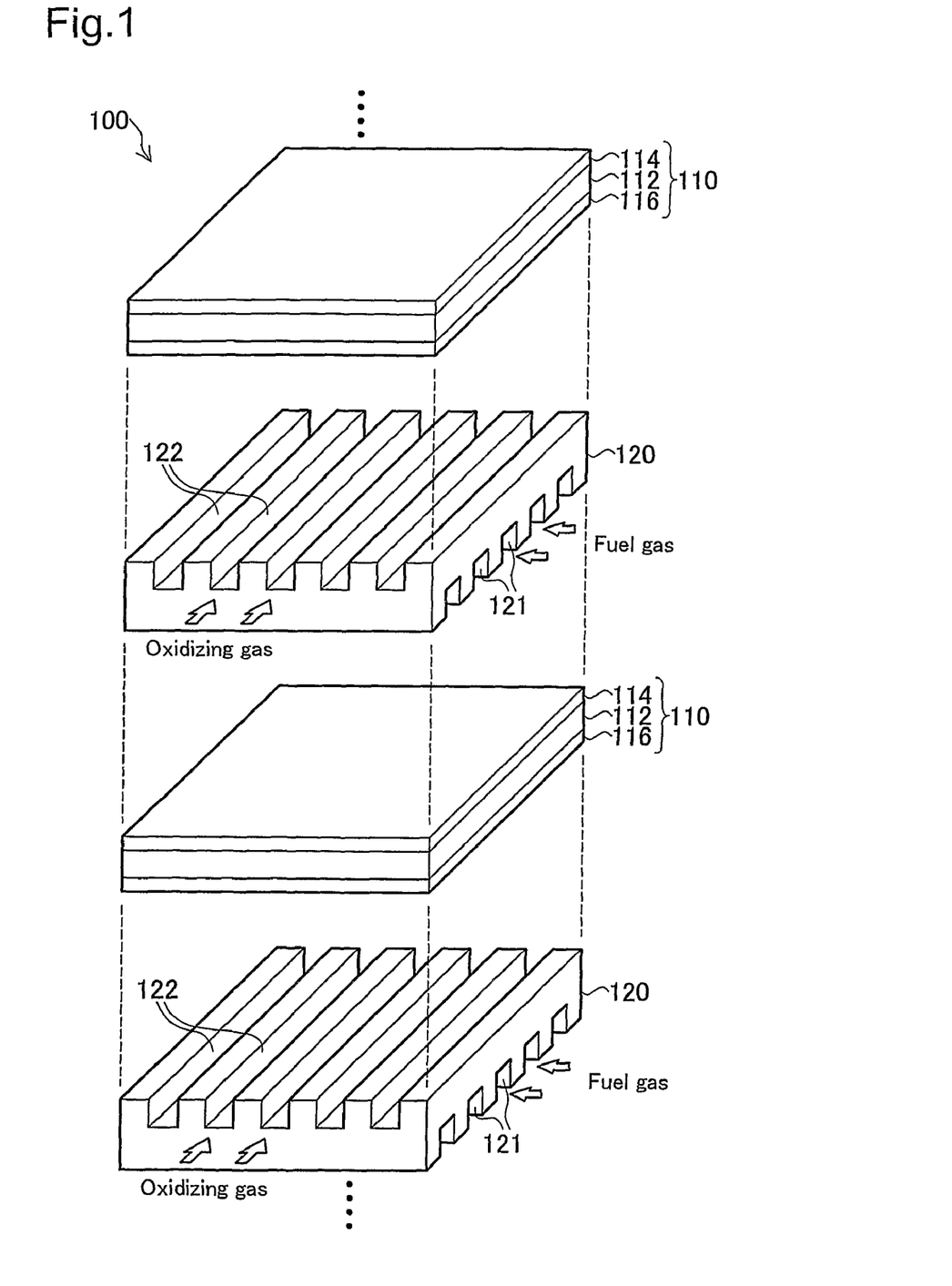
FIG. 1 schematically illustrates an example of the structure of a fuel cell comprising a cathode in an example of the invention.

The general structure of a fuel cell comprising the cathode in this example will be described with reference to FIG. 1. FIG. 1 schematically illustrates an example of the structure of a fuel cell comprising a cathode in an example of the invention.

The fuel cell 100 is a stacked fuel cell in which single cells 110 and separators 120 are alternately layered. The cell may be formed by a single cell 110 and two separators 120 flanking the single cell 110.

The single cells 110 comprise an electrolytic membrane 112, a cathode (air electrode) 114 provided on one side of the electrolytic membrane 112, and an anode (fuel electrode) 116 on the other side of the electrolytic membrane 112. The structure comprising the electrolytic membrane 112, cathode 114, and anode 116 is referred to as an MEA (membrane-electrode assembly). Each separator 120 comprises single cell fuel gas channel-forming components 121 for forming fuel gas channels in the single cell when assembled with the single cells 110, and single cell oxidizing gas channel-forming components 122 for forming oxidizing gas channels in the single cells.

The electrolytic membrane 112 is a film consisting of one or more proton-conducting solid electrolyte layers. Examples of solid electrolytes that is available to form the electrolytic membrane 112 include ceramic proton conductors of $BaCeO_3$ or $SrCeO_3$. The electrolytic membrane 112 can be made into a sufficiently thin film to be formed on the anode 116 comprising a compact hydrogen-permeable metal layer. That is, the hydrogen-permeable metal layer serves as the substrate, and a thin electrolyte membrane can be formed on the surface by PVD unidirectionally discharging the electrolyte material from a certain vapor deposition source. Examples of PVD unidirectionally discharging electrolyte materials from a certain vapor deposition source includes sputtering, ion plating, and vacuum deposition.

The cathode 114 comprises a gas-diffusing and conductive mixture of a first complex oxide B that primarily has oxygen ion conductivity, and inorganic material A that primarily has electron conductivity, and an oxygen dissociation-promoting catalyst C. The complex oxide B has an oxygen ion conductivity of at least $10^{-2}$ (S/cm) in the intermediate temperature range of 200° C. and 600° C. The oxygen dissociation-promoting catalyst C has greater catalytic activity in the oxygen dissociation reaction than the first and second complex oxides B and A in the above-mentioned intermediate temperature range. Specific examples of substances that are suitable for the above first and second complex oxides B and A, and the oxygen dissociation-promoting catalyst C are described below.

The anode 116 is formed by a hydrogen-permeable metal layer. A conductive and gas-diffusing gas diffusion layer may be provided between the separator 120 and the hydrogen-permeable metal layer. The anode 116 can be formed with Palladium (Pd) or Pd alloys. Alternatively, multilayered films can also be produced, in which the substrate is formed of a Group V metal such as vanadium (V) (niobium, tantalum, and the like may also be used in addition to V) or Group 5 alloys, and Pd or Pd alloy layers are formed on at least one side (single cell fuel gas channel 121 side). In the anode 116, the Pd (or Pd alloy) forming the surface on at least the single cell fuel gas channel 121 side has activity in bringing about the dissociation of hydrogen molecules into hydrogen atoms or hydrogen ions when hydrogen passes through the anode 116. The following anode side cell reaction takes place in the anode 116.

$$2H_2 + 2O^{2-} = 2H_2O + 4e^-$$

The separator 120 comprises a conductive and gas-impermeable material such as carbon or metal. The single cell fuel gas channel-forming components 121 described above are formed on one side of the separator 120, and protrusions for segmenting the single cell oxidation gas channel-forming components 122 are formed on the other side. Possible modifications in the single cells 110 in this example include also providing conductive and gas-permeable members (collectors) between the MEA and the separators 120.

Although not shown in FIG. 1, a fuel gas-supplying manifold, fuel gas exhaust manifold, oxidizing gas-supplying manifold, and oxidizing gas exhaust manifold may also be provided in the stacked fuel cell 100 through the method for stacking the single cells 110. The fuel gas supplied to the fuel cell 100 is distributed through the fuel gas-supplying manifold to the fuel gas channels in the single cells where it is involved in the power-generating reaction (electrochemical reaction), and is then discharged through the fuel gas exhaust manifold out of the fuel cell 100. On the other hand, the oxidizing gas supplied to the fuel cell 100 is distributed through the oxidizing gas-supplying manifold to the oxidizing gas channels in the single cells where it is involved in the power-generating reaction (electrochemical reaction), and is then discharged through the oxidizing gas exhaust manifold out of the fuel cell 100. Hydrogen-rich gas obtained by reforming hydrocarbon fuel, or high purity hydrogen gas, may be used as the fuel gas supplied to the fuel cell 100. Air may be used, for example, as the oxidizing gas supplied to the fuel cell 100.

The fuel cell 100 comprising the cathode 114 in the present example is a hydrogen dissociation membrane type (hydrogen-permeable membrane type) of fuel cell, and can be operated at an intermediate temperature range of about 200 to 600° C., which is lower than the operating temperature of conventional solid electrolyte types of fuel cells.

Figure 2:
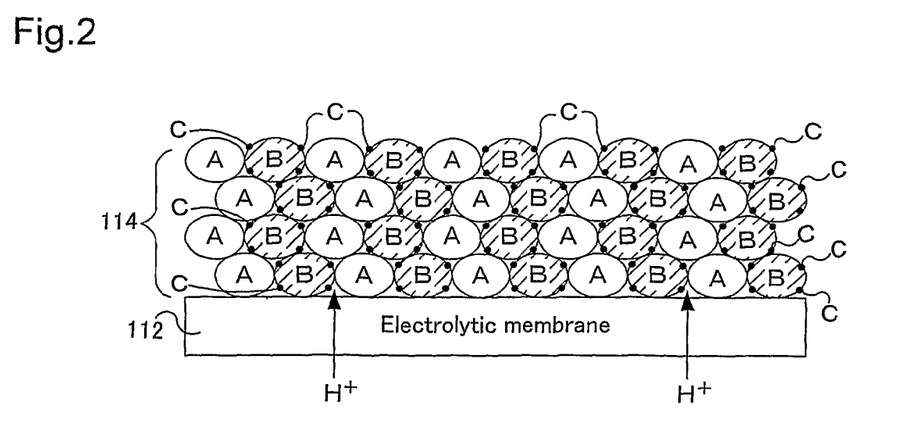
FIG. 2 schematically illustrates a first example of the structure of the cathode in an example of the invention.
Figure 3:
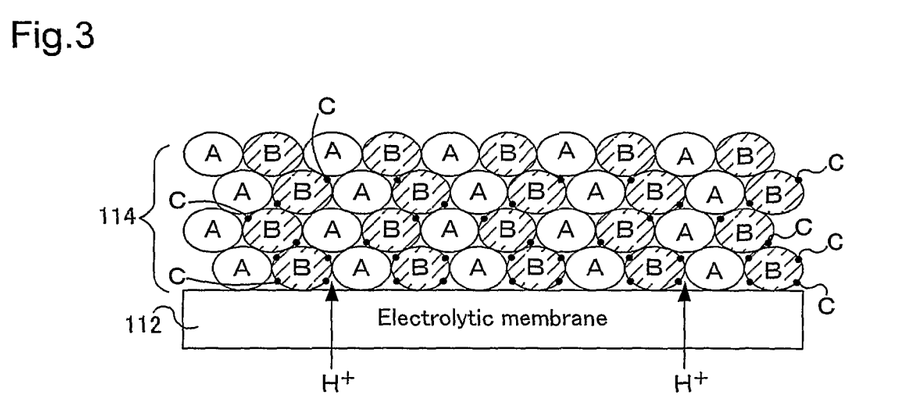
FIG. 3 schematically illustrates a second example of the structure of the cathode in an example of the invention.
Figure 4:
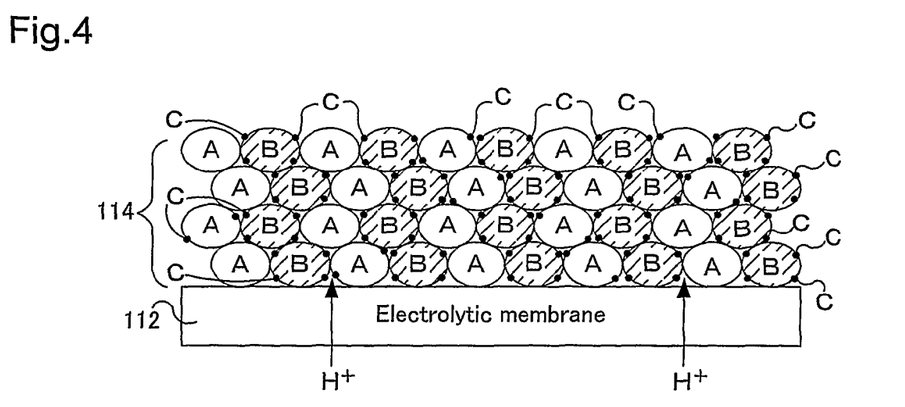
FIG. 4 schematically illustrates a third example of the structure of the cathode in an example of the invention.

The structure of the cathode 114 in the present example will be illustrated with reference to FIGS. 2 through 4. FIG. 2 schematically illustrates a first example of the structure of the cathode in an example of the invention. FIG. 3 schematically illustrates a second example of the structure of the cathode in an example of the invention. FIG. 4 schematically illustrates a third example of the structure of the cathode in an example of the invention.

In the example of the structure shown in FIG. 2, the cathode 114 is formed by the application of multiple layers of a composite consisting of a primarily electron conductive inorganic material A and a primarily oxygen ion conducting complex oxide B supporting an oxygen dissociation-promoting catalyst C. The compositional ratio between the complex oxide B and the inorganic material A should be 3:7 to 7:3 (A:B) when the particle diameter of the complex oxide B and the inorganic material A are about the same order. When the particle diameter of one is greater by one order of magnitude than the particle diameter of the other, such as when the particle diameter of the inorganic material A (=10 μm) is greater by one order of magnitude than the particle diameter of the complex oxide B (1 μm), the ratio should be 4:6 to 8:2 (A:B). The paths through which the oxygen ions and the electrons move can be made continuous in the membrane thicknesswise direction of the cathode 114 by adjusting the compositional ratio according to the particle diameters of the two components A and B. That is, the outermost layer of the cathode 114 facing the separator 120 (composite layer furthest from the electrolytic membrane 112) and the electrolytic membrane 112 are physically and electrically continuous through the inorganic material A and complex oxide B between them.

In the first example of the structure in FIG. 2, the oxygen dissociation-promoting catalyst C is supported only by the complex oxide B, and the same amount of oxygen dissociation-promoting catalyst C is supported in each composite layer (not intentionally modified).

Oxygen ions are thus also produced on the complex oxide B located at a distance from the electrolytic membrane 112, and the oxygen ions that are produced can easily move through the complex oxide B to the electrolytic membrane 112. The electrons produced in the anode 116 can easily move through the outermost layer of the cathode 114 and the inorganic material A up to the proximity of the electrolytic membrane 112. Water is produced by the reaction between the electrons, hydrogen ions permeating the electrolytic membrane 112, and oxygen ions migrating to the proximity of the electrolytic membrane 112.

In the second example of the structure illustrated in FIG. 3, the oxygen dissociation-promoting catalyst C is supported only by the complex oxide B, where the amount of the oxygen dissociation-promoting catalyst C that is supported decreases the further the distance from the electrolytic membrane 112 in the thicknesswise direction of the film. In FIGS. 3, 4 oxygen dissociation-promoting catalysts C are supported by the complex oxide B forming the lowermost row adjacent to the electrolytic membrane 112, two oxygen dissociation-promoting catalysts C are supported by the complex oxide B forming the two intermediate rows, and no oxygen dissociation-promoting catalyst C is supported by the complex oxide B forming the outermost layer.

In general, the water-producing reaction takes place in proximity to the electrolytic membrane 112 where the hydrogen ions (protons), oxygen ions, and catalyst are arranged. Can more oxygen ions should therefore be produced in the proximity of the electrolytic membrane 112. Moreover, noble metals are often used as the oxygen dissociation-promoting catalyst C. As such, costs can be reduced while ensuring the availability of the oxygen ions needed for their reaction to produce water by lowering the amount of the oxygen dissociation-promoting catalyst C that is supported the further of the distance from the electrolytic membrane 112 in the thicknesswise direction of the film.

The cathode 114 in the second structural example has the same structure and action as the cathode in the first structural example except for the points noted above.

In the third structural example illustrated in FIG. 4, the oxygen dissociation-promoting catalyst C is supported by the inorganic material A as well as by the complex oxide B. However, the amount of the catalyst C supported by the complex oxide B is greater than the amount of the catalyst C supported by the inorganic material A. The cathode 114 in the third structural example has the same structure and action as the cathode in the first structural example except for the points noted above.

Because a greater amount of the oxygen dissociation-promoting catalyst C is supported by the complex oxide B in this structure, the production of oxygen ions is still facilitated, and the oxygen ions that are produced can readily migrate to the proximity of the electrolytic membrane 112.

Figure 5:
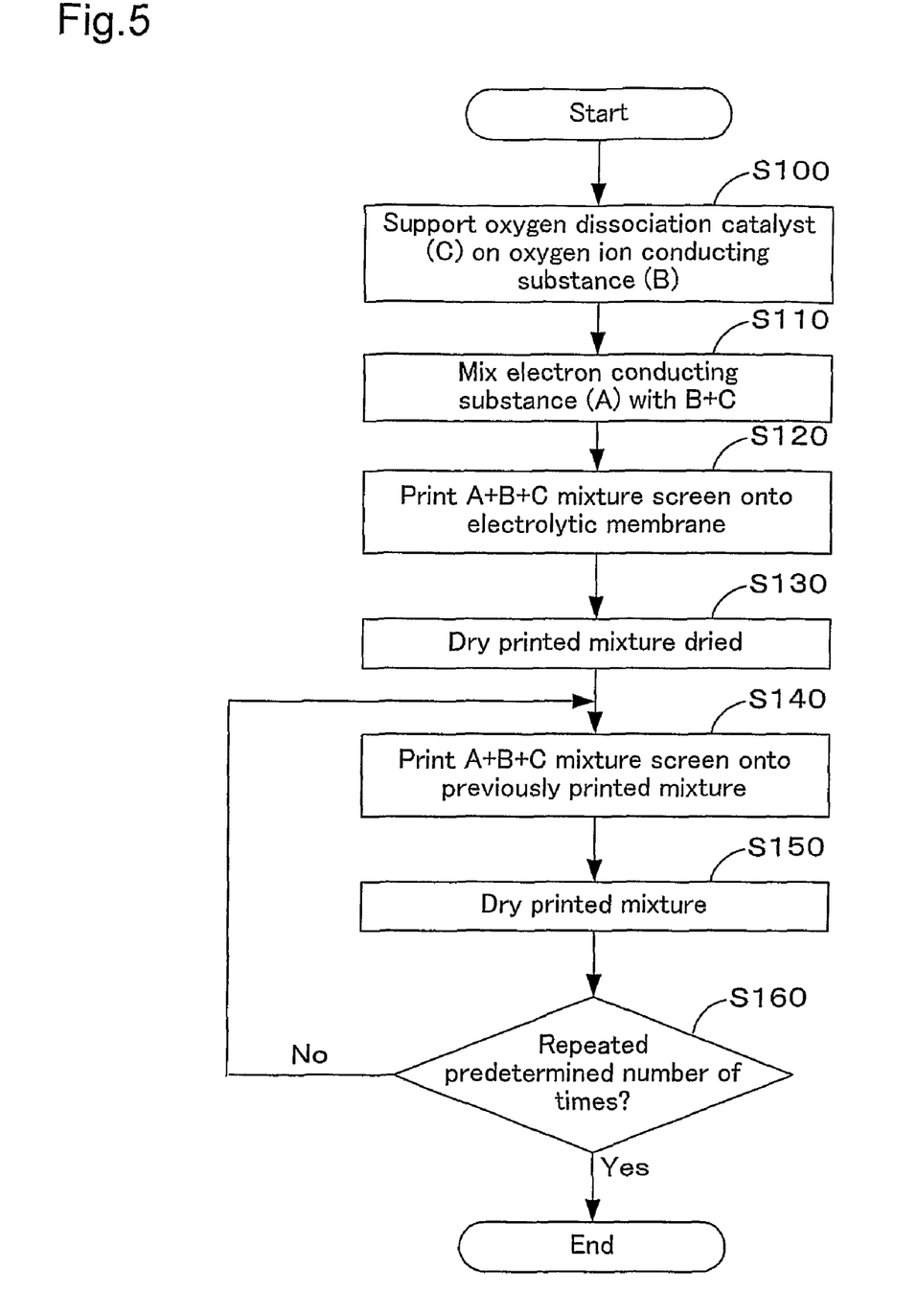
FIG. 5 is a flow chart of an example of a process for producing the cathode in an example of the invention.
Figure 6:
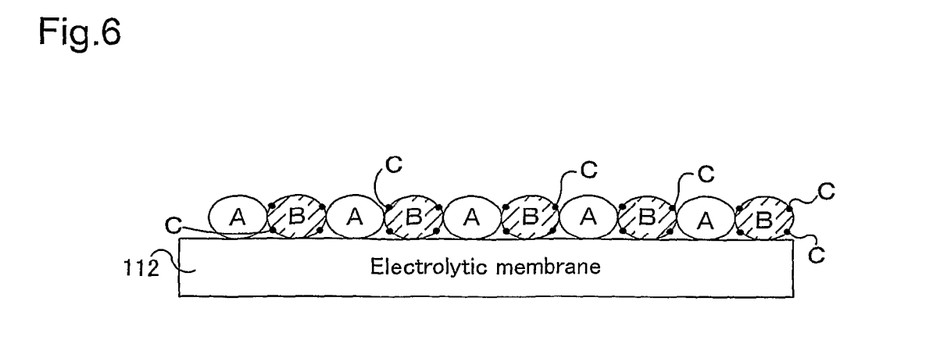
FIG. 6 illustrates a process for producing the cathode in an example of the invention.
Figure 7:
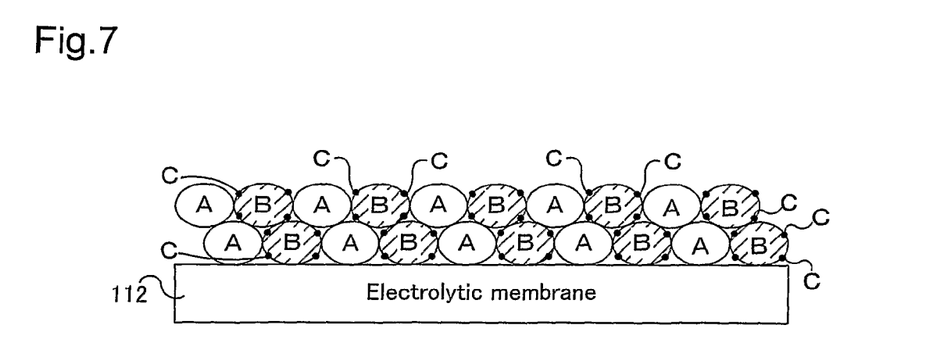
FIG. 7 illustrates another process for producing the cathode in an example of the invention.
Figure 8:
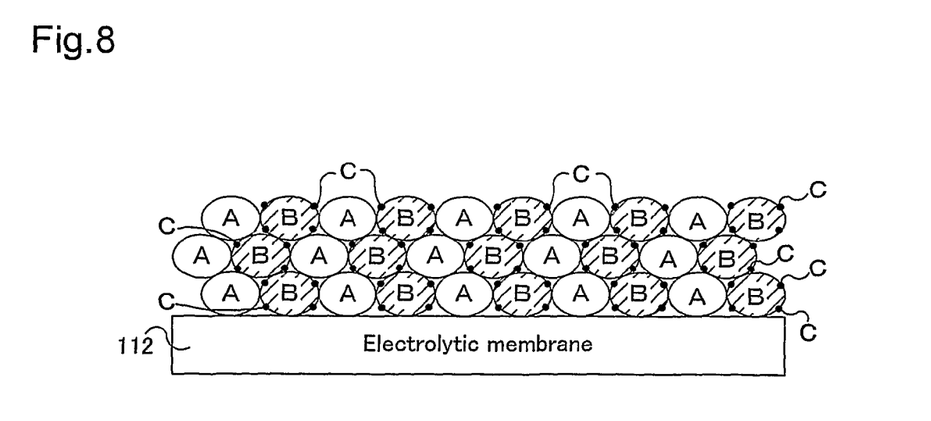
FIG. 8 illustrates yet another process for producing the cathode in an example of the invention.

A method for producing the cathode 114 in this example is described with reference to FIGS. 5 through 8. FIG. 5 is a flow chart of an example of a process for producing the cathode in an example of the invention. FIG. 6 illustrates a process for producing the cathode in an example of the invention. FIG. 7 illustrates another process for producing the cathode in an example of the invention. FIG. 8 illustrates yet another process for producing the cathode in an example of the invention.

The oxygen dissociation-promoting catalyst C is supported on an oxygen ion conducting material that primarily has oxygen ion conductivity (complex oxide B) (Step S100). The catalyst may be supported by impregnation or co-precipitation. Examples of complex oxides B include Bi systems ($Bi_{2-x}P_xO_3$, where P is a rare earth element) or La—Ga systems ($La_{1-x}P_xGa_{1-y}Q_yO_3$, where P is an alkali metal such as Sr or Ba, and Q is a metal such as Mn, Co, Mg, Fe, Ni, or Cu).

Noble metals such as Pt, Pd, and Ru, or alloys thereof, can be used as the oxygen dissociation-promoting catalyst C. When Pt is used, the support ratio is generally 0.1 to 1.0 wt %.

The complex oxide B supporting the oxygen dissociation-promoting catalyst C and the primarily electron-conducting substance (inorganic material A) are mixed to obtain a mixture (A+B+C) (Step S110). The materials may be mixed using a mortar and pestle or a homogenizer, giving a mixture in the form of a powder. Examples of the inorganic materials A include complex oxides of La—Sr systems ($La_{1-x}Sr_xMnO_3$) or metal materials such as SUS and Ag. Electron conductivity is a temperature-related function in the same manner as oxygen ion conductivity, but is less temperature dependent then is oxygen on conductivity. The range of complex oxides that is available for the inorganic material A is thus greater than that for the complex oxide B. As such, commonly used combinations of oxygen ion/electron conductors can be used in solid electrolyte types of fuel cells.

An electrolytic membrane 112 formed on a hydrogen-permeable metal is then prepared, the mixture (A+B+C) is applied by screen printing onto the electrolytic membrane 112 (Step S120), and the applied mixture (A+B+C) is dried (Step S130). This results in the formation of a layer of the mixture (A+B+C) as illustrated in FIG. 6, for example, on the electrolytic membrane 112. A 5 μm to 50 μm layer of the mixture is formed per screen printing.

The mixture is then screen printed again onto the previously formed layer (Step S140) and dried (Step S150), this being done repeatedly (Step S160: No). As a result, layers of the mixture (A+B+C+) are sequentially formed as illustrated in FIGS. 7 and 8, for example, on the electrolytic membrane 112. This is repeated until the cathode 114 has a thickness (the thickness of the mixture layer) of 50 μm to 100 μm, for example, resulting in laminated layers of the mixture. Finally, the layers of the mixture may undergo a baking treatment. The baking treatment may be carried out for between 1 hour at 600° C. and five hours at 800° C.

The process for producing the cathode 114 is finished when the prescribed number of screen printings is complete (Step S160: Yes).

Figure 9:
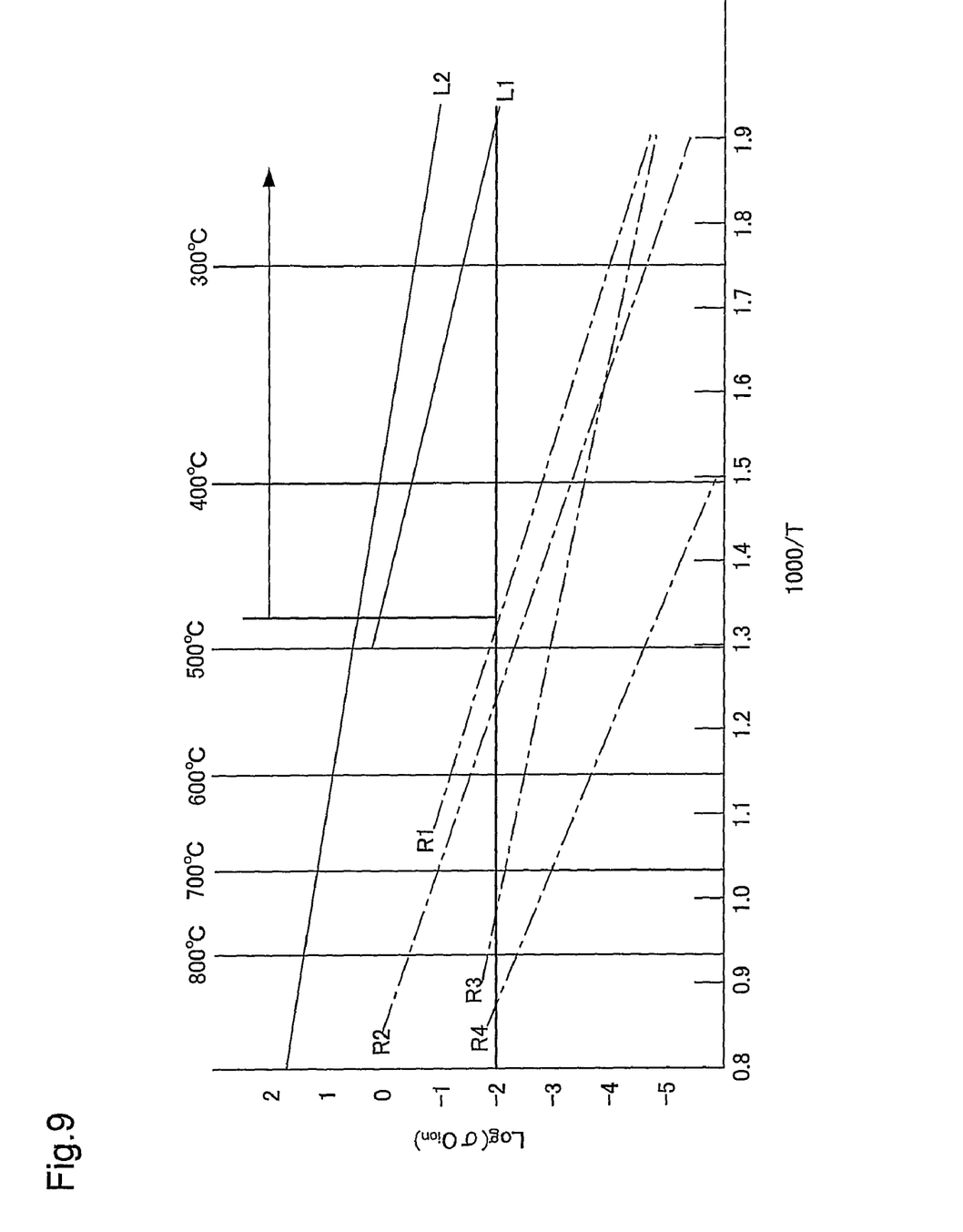
FIG. 9 illustrates the oxygen ion conductivity, relative to the inverse of absolute temperature, of the complex oxide B used in the example of the invention and of a complex oxide material commonly used as the combined oxygen ion/electron conductor in solid electrolyte types of fuel cells.

Specific examples are described below with reference to FIG. 9. FIG. 9 illustrates the oxygen ion conductivity, relative to the inverse of absolute temperature, of the complex oxide B used in the example of the invention and of a complex oxide material commonly used as the combined oxygen ion/electron conductor in solid electrolyte types of fuel cells.

The horizontal axis in FIG. 9 numeral now I represents the inverse of the absolute temperature or multiplied by 1000, and the vertical access represents the oxygen ion conductivity log $\{\sigma O \text{ ion (S/cm)}\}$. The complex oxides B used in the two examples below exhibit properties L1 and L2, while the complex oxides commonly used as combined oxygen ion/electron conductors in solid electrolyte fuel cells exhibit properties R1 through R4.

R1: $Bi_{1.6}Er_{0.4}O_3$
R2: $Ce_{0.8}Gd_{0.2}O_2$-δ (6% $H_2$ saturated with $H_2O$ at 25° C.)
R3: $Bi_{23}V_4O_{44.5}$
R4: $ZrO_2$-8% mol $Y_2O_3$ (4 μm thin film)

EXAMPLE 1

In Example 1, $Bi_{1.5}Dy_{0.5}O_3$ was used as the complex oxide B, $La_{0.5}Sr_{0.5}MnO_3$ was used as the inorganic material A, and Pt was used as the oxygen dissociation-promoting catalyst C. The $Bi_{1.5}Dy_{0.5}O_3$ that was used as the complex oxide B had an oxygen ion conductivity (S/cm) of at least $10^{-2}$ in the intermediate temperature range of 300 to 600° C., as shown in FIG. 9.

As described in the method for producing the cathode 114 above, the oxygen dissociation-promoting catalyst C was first supported on the complex oxide B before being mixed with the inorganic material A. A choroplatinic acid solution was used to support 0.5 wt % Pt on the $Bi_{1.5}Dy_{0.5}O_3$ powder. The platinum support $Bi_{1.5}Dy_{0.5}O_3$ and the $La_{0.5}Sr_{0.5}MnO_3$ were mixed in a proportion of 1:1 (vol) using a mortar and pestle, and the mixture was passed through a roll mill, giving a paste. The resulting paste was screen printed on to the electrolytic membrane, and was dried at 90 degrees. The paste was screened and dried at 90 degrees two more times on the layer of the mixture obtained above, giving a cathode.

A 10 μm layer of the mixture was formed by each screen printing, resulting in a cathode that was 30 μm thick.

EXAMPLE 2

In Example 2, $La_{0.7}Sr_{0.3}Ga_{0.7}Fe_{0.3}O_3$ was used as the complex oxide B, $La_{0.5}Sr_{0.5}MnO_3$ was used as the inorganic material A, and Pt was used as the oxygen dissociation-promoting catalyst C. The $La_{0.7}Sr_{0.3}Ga_{0.7}Fe_{0.3}O_3$ that was used as the complex oxide B had an oxygen ion conductivity (S/cm) of at least $10_{-2}$ in the intermediate temperature range of 300 to 600° C., as shown in FIG. 9.

In Example 2, unlike the method for producing the cathode 114 described above, the complex oxide B and inorganic material were mixed before the support of the oxygen dissociation-promoting catalyst C. The $La_{0.7}Sr_{0.3}Ga_{0.7}Fe_{0.3}O_3$ and $La_{0.5}Sr_{0.5}MnO_3$ were mixed in a proportion of 1:1 (vol) using a mortar and pestle. The resulting mixed powder was dipped in a chloroplatinic acid solution, dried at 80° C., and fired at 500° C. to support 0.5 wt % Pt. The resulting platinum-supporting mixture (A+B+C) was mixed with a binder and solvent, and was passed through a roll mill, giving a paste. The resulting paste was screen printed on to the electrolytic membrane, and was dried at 90 degrees. The paste was screened and dried at 90 degrees two more times on the layer of the mixture obtained above, and a cathode was ultimately obtained when the above was baked for 5 hours at 600° C.

A 10 μm layer of the mixture was formed by each screen printing, resulting in a cathode that was 30 μm thick.

As described above, the cathode 114 in this example was formed from a complex oxide B primarily having oxygen ion conductivity, an inorganic material a having primarily electron conductivity, and an oxygen dissociation-promoting catalyst C having greater activity in the oxygen dissociation reaction than the first and second complex oxides at an intermediate temperature of 100 to 600° C. or 200 to 600° C., for example. A complex oxide with an oxygen ion conductivity of at least $10^{-2}$ at an intermediate temperature of 100 to 600° C. or 200 to 600° C., for example, was used as the complex oxide B. It was thus possible to bring about good oxygen ion conductivity and electron conductivity at an intermediate temperature range, which could not be done with conventional complex oxide materials combining oxygen ion and electron conductivity. It is thus possible to improve the power-generating performance of fuel cells such as hydrogen-permeable film types of fuel cells by using the cathode 114 of this example.

That is, a complex oxide material with an oxygen ion conductivity of at least $10^{-2}$ at the intermediate temperature range can be used as the complex oxide B to promote the oxygen dissociation activation reaction triggered by the cathode and facilitate the migration of greater amounts of oxygen ions in the proximity of the electrolytic membrane 112. More water can thus be produced in the proximity of the electrolytic membrane 112, providing more power more efficiently than in the past.

Figure 10:
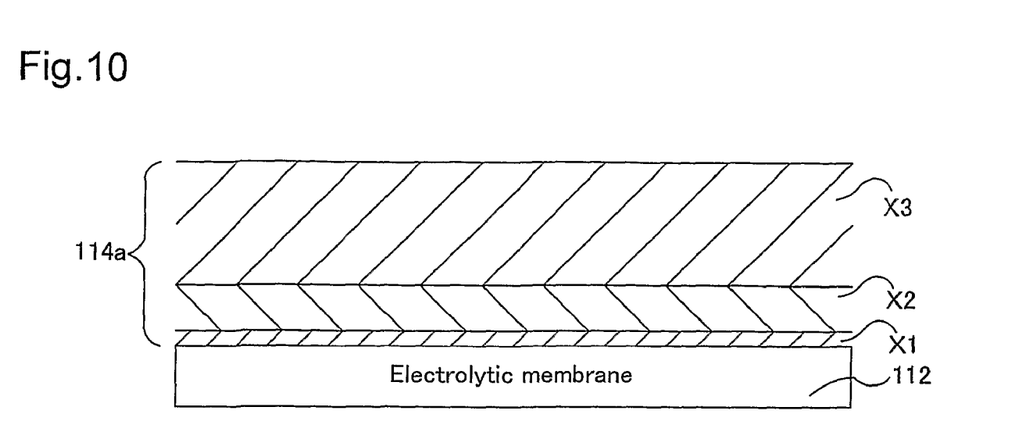
FIG. 10 is a schematic cross section of the cathode in another example.

Other Embodiments (1) The process for producing the cathode in the above example was explained with the use of complex oxides B supporting the same amount of oxygen dissociation-promoting catalyst C, but as illustrated in FIG. 10, the cathode may also be formed with the amount of supported oxygen dissociation-promoting catalyst C decreasing the further the distance from the electrolytic membrane 112 in the thicknesswise direction of the cathode 114. FIG. 10 is a schematic cross section of the cathode in another example.

In this example, the following mixtures were prepared.

X1: complex oxide B+oxygen dissociation-promoting catalyst C5 wt % inorganic material A X2: complex oxide B+oxygen dissociation-promoting catalyst C1 wt % inorganic material A X3: complex oxide B+oxygen dissociation-promoting catalyst C0 wt % inorganic material A One layer of the mixture X1 is formed on the electrolytic membrane 112, four layers of mixture X2 are then formed, and 15 layers of mixture X3 are finally formed. The layer of mixture X1 is thus 5 µm, the layers of mixture X2 are 20 µm, and the layers of mixture X3 are 75 µm, resulting in a cathode 114a that is 100 µm. The layers of these mixtures can be formed by screen printing and drying processes.

(2) A proton conductor may be mixed with the mixture (A+B+C) in the above examples. The addition of the proton conductor will allow the hydrogen ions (protons) that reach the electrolytic membrane 112 to migrate to the outermost layer of the cathode 114. The water-producing reaction can thus take place in the proximity of the cathode 114 but also in the intermediate layers to the outermost layer of the cathode 114. That is, a water-producing reaction field is also formed (the water-producing reaction field can be expanded) in areas other than the border between the cathode 114 and the electrolytic membrane 112 (the entire cathode 114). The cathode 114 can thus be used to dramatically increase the water-producing reaction in conjunction with the better production of oxygen ions, further improving the power-generating efficiency of the fuel cell.

Examples of proton conductors include $BaZrO_3$, $SrCeO_3$, and $SrZrO_3$. Proton/electron conductors may also be used instead of proton conductors. Examples of such proton/electron conductors include Pd, Pd/Gd, Pd/Ag, Pd/Pt, and $BaCe_{1-x}Y_xO_3$ (x=0 to 0.3).

(3) In the above examples, the distribution of the first and second complex oxides B and A was virtually equivalent in the film thicknesswise direction of the cathode 114, but B and A may be distributed in the following manner. In general, the action of the electrodes and catalyst are more dominant in the areas near the electrolytic membrane in the cathode, while in areas further away from the electrolytic membrane (near the outermost layer) the action of the collector is more dominant. Accordingly, the distribution of the complex oxide B can be greater in the layers near the electrolytic membrane 112 among the mixture layers forming the cathode 114, while the distribution of the inorganic material A can be greater in the layers near the outermost layers among the mixture layers forming the cathode 114. For example, a mixture where B:A=7:3 can be used in the bottom layer (5 µm layer) adjacent to the electrolytic membrane 112, a mixture where B:A=5:5 can be used in the intermediate layers (10 µm layers), and a mixture where A:B=3:7 can be used in the upper layers (85 µm layers). In this case, the function required of the cathode can be optimized in each site of the cathode. It is thus possible to improve the power-generating efficiency of fuel cells comprising this cathode.

(4) In addition to being coated onto the electrolytic membrane, the mixture of the first and second complex oxides B and A and the oxygen dissociation catalyst C can also be applied by spraying, aerosol deposition, or cold spraying.

(5) A sol gel solution of the inorganic material A may be used instead of powder. In this case, a precursor solution of the inorganic material A and the complex oxide B are mixed in a roll mill, and the resulting mixture is screen printed onto the electrolytic membrane.

(6) Refrigerant channels may be provided to allow a refrigerant to pass through whenever a certain number of single cells is stacked up or between the single cells 110 in order to control the internal temperature of the fuel cell 100.

A cathode based on the invention and a fuel cell comprising such a cathode were described in the above examples, but the embodiments of the invention above are intended to facilitate an understanding of the invention and do not limit the invention. The invention can be modified and improved without departing from the spirit and scope of the invention, and such equivalents are, of course, encompassed by the invention.

The invention claimed is:

1. A cathode for a fuel cell comprising:
a proton conducting electrolytic membrane on which the cathode is formed;
a complex oxide having primarily oxygen ion conductivity;
an inorganic material having primarily electron conductivity, wherein the complex oxide and the inorganic material have conductive paths that are continuous in a thicknesswise direction of the cathode, respectively; and
an oxygen dissociation catalyst having greater catalyst activity in an oxygen dissociation reaction than the complex oxide and the inorganic material at a predetermined temperature range, wherein
a compositional ratio between the complex oxide and the inorganic material is 3:7 to 7:3, inorganic material:complex oxide, when a particle diameter of either the inorganic material or the complex oxide is about a same order of magnitude of, a particle diameter of the other of the inorganic material or the complex oxide respectively,
wherein the complex oxide forms:
a lowermost row adjacent the electrolytic membrane;
an outermost row opposite the lowermost row; and
two intermediate rows between the lowermost row and the outermost row,
each complex oxide of the lowermost row is configured to support four catalysts, each complex oxide of the two intermediate rows is configured to support two catalysts, and each complex oxide of the outermost row is configured to support zero catalysts.

2. A cathode according to claim 1, wherein the oxygen dissociation catalyst is supported at least by the complex oxide.

3. A cathode according to claim 1, wherein more of the oxygen dissociation catalyst is supported by the complex oxide than by the inorganic material.

4. A cathode according to claim 1, wherein the cathode has a contact surface in contact with the electrolytic membrane, and
the amount of the oxygen dissociation catalyst that is supported decreases the further the distance from the surface in contact with the electrolytic membrane.

5. A cathode according to claim 1, wherein the oxygen ion conductivity of the complex oxide is at least $10^4$ (S/cm) at the predetermined temperature range.

6. A cathode according to claim 1 further comprising:
a proton-conducting material.

7. A cathode according to claim 1,
wherein the cathode is used in a hydrogen separation membrane type of fuel cell comprising an electrolytic membrane with a proton-conducting electrolyte laminated to a hydrogen-permeable metal film.

8. A fuel cell comprising:
a cathode according to claim 1;
an anode; and
a proton conducting electrolytic membrane, with the cathode disposed on one side, and the anode disposed on the other side.

9. A method of producing a cathode for a fuel cell comprising:
supporting an oxygen dissociation catalyst on a complex oxide having primarily oxygen ion conductivity;
physically mixing the complex oxide supporting the oxygen dissociation catalyst with an inorganic material having primarily ion conductivity, a compositional ratio between the complex oxide and the inorganic material is 3:7 to 7:3, inorganic material:complex oxide, when a particle diameter of either the inorganic material or the complex oxide is about a same order of magnitude of, a particle diameter of the other of the inorganic material or the complex oxide respectively; and
forming the mixture of the inorganic material and the complex oxide supporting the oxygen dissociation catalyst into a film on one side of a proton conducting electrolytic membrane;
wherein the complex oxide and the inorganic material have conductive paths that are continuous in a thicknesswise direction of the cathode, respectively; and
wherein the complex oxide forms:
a lowermost row adjacent the electrolytic membrane;
an outermost row opposite the lowermost row; and
two intermediate rows between the lowermost row and the outermost row,
each complex oxide of the lowermost row is configured to support four catalysts, each complex oxide of the two intermediate rows is configured to support two catalysts, and each complex oxide of the outermost row is configured to support zero catalysts.

10. A method of producing a cathode for a fuel cell according to claim 9 further comprising:
forming another film of the mixture on the previously formed film of the mixture.

11. A cathode for a fuel cell comprising:
a proton conducting electrolytic membrane on which the cathode is formed;
a complex oxide having primarily oxygen ion conductivity;
an inorganic material having primarily electron conductivity, wherein the complex oxide and the inorganic material have conductive paths that are continuous in a thicknesswise direction of the cathode, respectively; and
an oxygen dissociation catalyst having greater catalyst activity in an oxygen dissociation reaction that the complex oxide and the inorganic material at a predetermined temperature range, wherein
a compositional ratio between the complex oxide and the inorganic material is 4:6 to 8:2, inorganic material:complex oxide, when the particle diameter of either the inorganic material or the complex oxide is greater by one order of magnitude than the particle diameter of the other of the inorganic material or the complex oxide, respectively; and
wherein the complex oxide forms:
a lowermost row adjacent the electrolytic membrane;
an outermost row opposite the lowermost row; and
two intermediate rows between the lowermost row and the outermost row,
each complex oxide of the lowermost row is configured to support four catalysts, each complex oxide of the two intermediate rows is configured to support two catalysts, and each complex oxide of the outermost row is configured to support zero catalysts.

* * * * *